United States Patent
Hama et al.

(10) Patent No.: US 7,567,852 B2
(45) Date of Patent: *Jul. 28, 2009

(54) SYSTEM FOR DETERMINING ARRAY SEQUENCE OF PLURALITY OF PROCESSING OPERATIONS

(75) Inventors: Toshiyuki Hama, Tokyo (JP); Hiroyuki Okano, Yokohama (JP); Takayuki Yoshizumi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 226 days.

This patent is subject to a terminal disclaimer.

(21) Appl. No.: 11/710,306

(22) Filed: Feb. 23, 2007

(65) Prior Publication Data

US 2008/0082199 A1    Apr. 3, 2008

(30) Foreign Application Priority Data

Feb. 23, 2006    (JP)    ............................... 2006-047330

(51) Int. Cl.
G06F 19/00    (2006.01)

(52) U.S. Cl. ...................................... 700/149; 700/101

(58) Field of Classification Search ............. 700/28–31, 700/99–101, 149; 705/8–10
See application file for complete search history.

(56) References Cited

U.S. PATENT DOCUMENTS

| | | | |
|---|---|---|---|
| 6,109,776 A * | 8/2000 | Haas | ............................ 702/20 |
| 6,977,935 B2 * | 12/2005 | Kamiya et al. | ............ 370/395.4 |
| 7,161,943 B2 * | 1/2007 | Kamiya et al. | ............ 370/395.4 |
| 7,293,090 B1 * | 11/2007 | Saleh et al. | .................. 709/226 |
| 2005/0021528 A1 * | 1/2005 | Andreev | ...................... 707/100 |
| 2005/0177351 A1 * | 8/2005 | Goldberg et al. | ............... 703/1 |
| 2007/0115958 A1 * | 5/2007 | Kamiya et al. | .............. 370/386 |
| 2008/0037550 A1 * | 2/2008 | Kamiya et al. | ............ 370/395.4 |

FOREIGN PATENT DOCUMENTS

| | | |
|---|---|---|
| JP | PUPA 63-053215 | 7/1988 |
| JP | PUPA 07-118763 | 9/1995 |
| JP | 2000-167610 | 6/2000 |
| JP | 2004-209495 | 7/2004 |

* cited by examiner

*Primary Examiner*—M. N. Von Buhr
(74) *Attorney, Agent, or Firm*—Ann Dougherty; Shimokaji & Associates, P.C.

(57) ABSTRACT

A method and system for determining an array sequence of processing operations to maximize the efficiency of steel plate processing. Between two processing operations, a first sequence constraint based on a first attribute of each processing operation and a second sequence constraint based on a second attribute of each processing operation are defined. A system selects, as a cluster, at least one of processing operations having a common attribute value of the first attribute, and arranged in a sequence satisfying the second sequence constraint. The system regards the first sequence constraint as a sequence constraint between a plurality of clusters, and arranges the plurality of clusters in a sequence maximizing the efficiency of processing.

2 Claims, 13 Drawing Sheets

Fig. 2

| OPERATION ID | TYPE | WIDTH | THICKNESS | LENGTH | TENSION | INSPECTION CODE | DELIVERY DATE | CATEGORY OF QUALITY |
|---|---|---|---|---|---|---|---|---|
| 1 | A | 926 | 4.05 | 0.45 | 35 | 3415 | 06/01 | D |
| 2 | A | 1360 | 3.95 | 0.31 | 34 | 3325 | 06/02 | R |
| ... | ... | | ... | | | ... | ... | ... |
| n | B | 1440 | 4.05 | 0.40 | 34 | 1625 | 06/03 | O |
| ...... | ...... | | ...... | | | ...... | ...... | ...... |

CONSTRAINT

160

| ATTRIBUTE | SEQUENCE CONSTRAINT |
|---|---|
| WIDTH | CONSTRAINT ON WIDTH TRANSITION |
| THICKNESS | CONSTRAINT ON THICKNESS TRANSITION |
| CATEGORY OF QUALITY | CONSTRAINT BETWEEN DIFFICULT MANUFACTURE SLABS |
| CATEGORY OF QUALITY | CONSTRAINT ON RECOVERY SLAB |
| CATEGORY OF QUALITY | CONSTRAINT ON SUPERIOR QUALITY SLAB |

OBJECTIVE FUNCTION
- LARGER LENGTH OF STEEL SHEETS
- LARGER NUMBER OF DIFFICULT PROCESSING OPERATIONS
- SMALLER NUMBER OF RECOVERY PROCESSING OPERATIONS
- SHORTER TIME OF DELIVERY DELAY

SYSTEM FOR DETERMINING ARRAY SEQUENCE OF PLURALITY OF PROCESSING OPERATIONS

FIELD OF THE INVENTION

The present invention relates to a system for determining an array sequence of a plurality of processing operations. In particular, the present invention relates to a system for determining an array sequence of a plurality of processing operations so that the array sequence can maximize the efficiency under predetermined sequence constraints.

BACKGROUND OF THE INVENTION

Up to now, steel plants have been producing steel sheets of various thicknesses and dimensions by the hot rolling process. In the hot rolling process, a thin steel sheet called a coil is produced from a thick steel plate called a slab by rolling out the slab held from above and below by a set of work rolls of a rolling mill. The surface quality of a coil thus produced depends on the surface condition of the work rolls. In addition, rolling a plurality of thick plates one after another using a certain set of work rolls gradually deteriorates the surface condition of the work rolls. For this reason, the rolling of a steel plate requiring a high quality is preferably done with a set of work rolls while the rolls are still fresh.

Moreover, rolling a steel plate may sometimes leave a groove, as wide as the plate, on the surface of the work rolls. Accordingly, the groove left on the surface of the work rolls by a narrower steel plate rolled earlier may sometimes leave a flaw on the surface of a wider steel plate that is rolled later. Furthermore, the specification of rolling equipment or the like limits, within a certain range, the difference in thickness, if any, between two steel plates that are successively rolled. Still furthermore, especially thinner steel plates cannot be successively rolled in large numbers, in order to prevent the deterioration in the durability of work rolls. As seen from above, various constraints on the sequence of rolling steel plates should be satisfied to maintain the quality of steel sheets and to improve the productivity.

Studies have been done thus far on a problem for determining, by computation, a sequence of objects under certain constraints (refer to Japanese Patent Application Publications No. 2000-167610 and No. 2004-209495). The kind of problem is called a scheduling problem. The framework of the conventional scheduling problem, however, has difficulty in dealing with a scheduling problem in the hot rolling process, due to the large scale of the problem and various constraints, such as those mentioned above, imposed on the process. To solve a large scale problem within a practical time, a conventionally known method is, firstly, finding a feasible solution, which is not optimum but satisfies the constraints, and then gradually improving the feasible solution. In the case of the hot rolling process, however, just to find a feasible solution is sometimes difficult. To be more precise, it is sometimes difficult just to find a solution that, even though not being an optimum solution, satisfies many constraints of different characteristics. The constraints include, for example, a local constraint such as the defining of the relationship between steel plates to be successively rolled. The constraints also include a global constraint, such as the sequencing of the rolling operations of the steel plate as a function of the durability of work rolls.

SUMMARY OF THE INVENTION

Under these circumstances, an object of the present invention is to provide a system, a method and a program, which are capable of solving the above-mentioned problem. This object is achieved by combining the features recited in the independent claims In addition, the dependent claims define more advantageous specific examples of the present invention.

In order to solve the above problem, the present invention provides a system for determining an array sequence of a plurality of processing operations, each of which processes a steel plate. In the system, a first sequence constraint based on a first attribute of each processing operation and a second sequence constraint based on a second attribute of each processing operation are defined between each of the processing operations and each of the other processing operations. The system includes a classifying section, a rough-scheduling section, a judging section and a detail-scheduling section. The classifying section classifies the plurality of processing operations into a plurality of clusters according to attribute values of the first attribute, and arranges the processing operations included in each cluster in a sequence satisfying the second sequence constraint. The rough-scheduling section regards the first sequence constraint as a constraint between the plurality of clusters, and arranges the plurality of clusters in a sequence maximizing the efficiency of steel plate processing. The judging section judges whether or not the second sequence constraint is satisfied between the last processing operation in the array of a first cluster and the first processing operation in the array of a second cluster arranged next to the first cluster. The detail-scheduling section, on condition that the second sequence constraint is not satisfied, searches for another processing operation satisfying the second sequence constraint with both the last processing operations in the array of the first cluster and the first processing operation in the array of the second cluster. The detail-scheduling section, then, arranges the searched-out processing operation next to the first cluster and before the second cluster. In addition, the present invention provides a method for determining the array sequence by means of the system and a program causing an information processing apparatus to function as the system.

Note that the outline of the present invention mentioned above is not an enumerated list including all of the necessary features of the present invention, and any sub-combination of these features may be included in the present invention.

BRIEF DESCRIPTION OF THE DRAWINGS

For a more complete understanding of the present invention and the advantages thereof, reference is now made to the following description taken in conjunction with the accompanying drawings.

FIG. 2 shows an example of a data structure of an attribute storage unit 150.

FIG. 3 shows an example of a data structure of a problem storage unit 160.

DETAILED DESCRIPTION OF THE PREFERRED EMBODIMENT

The present invention will be described below by using an embodiment, although the present invention recited in the scope of claims is not limited to the embodiment. Moreover, all of the combinations described in the embodiment are not indispensable for solving means of the present invention.

Figure 1:
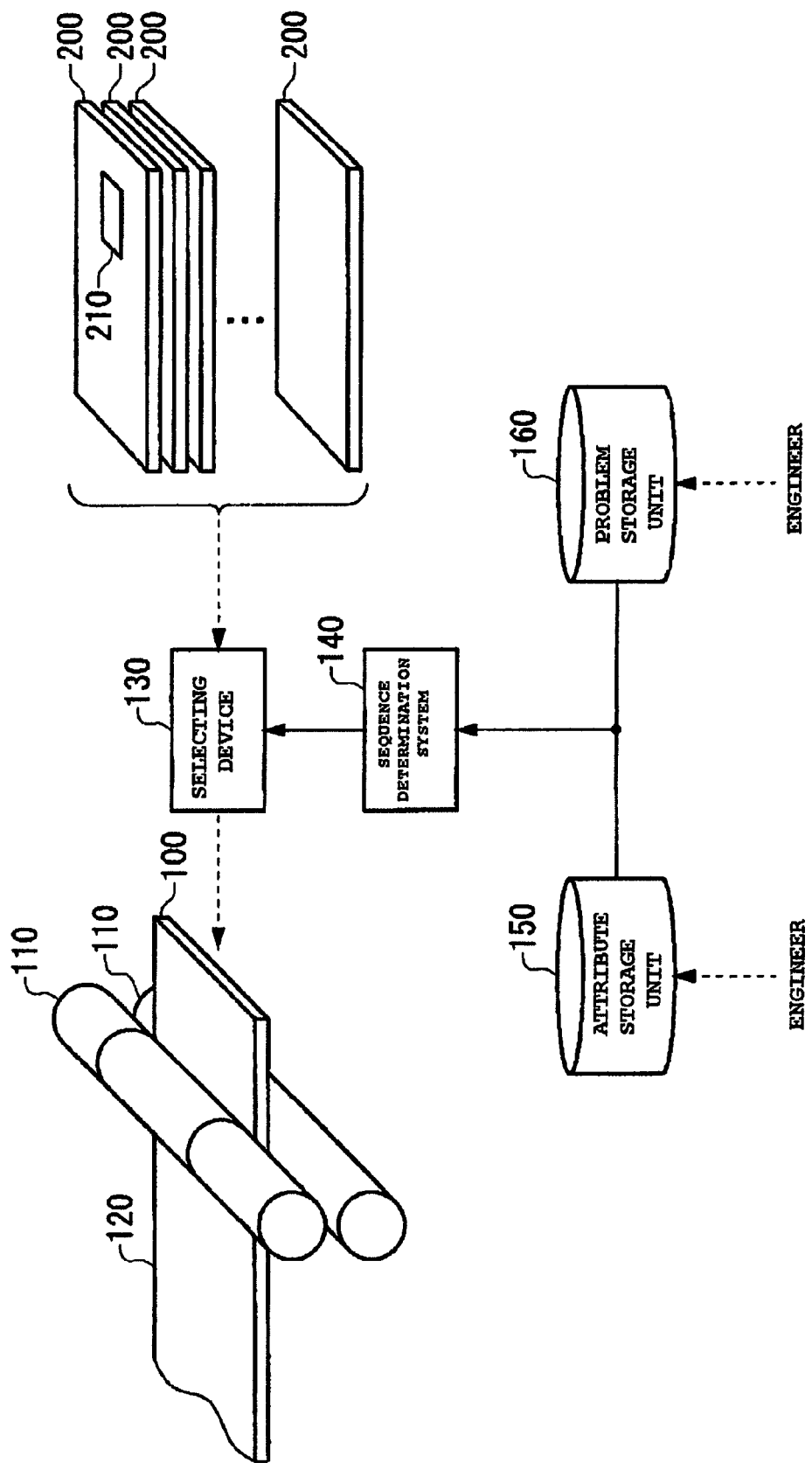
FIG. 1 shows an entire structure of a steel plate processing apparatus 10.

FIG. 1 shows an entire structure of a steel plate processing apparatus 10. The steel plate processing apparatus 10 is an apparatus that produces a plurality of steel sheets by sequentially processing a plurality of steel plates in response to the instruction of a user. The steel plate processing apparatus 10 includes work rolls 110, a selection device 130, a sequence determination system 140, an attribute storage unit 150 and a problem storage unit 160. A thick plate 100 is processed by the work rolls 110 holding the thick plate 100 from above and below and rolling it therethrough to produce a thin sheet 120. The selection device 130 sequentially selects a thick plate 100 among a plurality of thick plates 200 according to a sequence determined by the sequence determination system 140. The thick plate 100 thus selected is then subjected to the rolling process by the work rolls 110.

Each one of the plurality of processing operations processes one of the plurality of thick plates 200, and each processing operation has a plurality of attributes. Examples of these attributes are the thickness, the width, and the surface quality of the resultant steel sheet that has passed through the rolling process. An attribute value of each attribute may be written in, for example, an attribute label 210 attached to the thick plate 200. At the same time, the attribute storage unit 150 stores the attribute value of each of the attributes, relating the values to the corresponding one of the plurality of processing operations. Moreover, sequence constraints are defined, between each one of the processing operations and each one of the other processing operations. The sequence constraints are defined based on the attributes that each of the relevant processing operations has. The problem storage unit 160 stores the sequence constraints.

Furthermore, the problem storage unit 160 stores a function for calculating an index value indicating the efficiency of steel plate processing. This function is used as an objective function for finding out the index to be maximized when the array sequence of the processing operations is determined. The sequence determination system 140 arranges the plurality of processing operations in a sequence satisfying the sequence constraints stored in the problem storage unit 160, and maximizing the value of the objective function. The sequence determination system 140 outputs the array sequence of the processing operations to the selection device 130.

FIG. 2 shows an example of a data structure of the attribute storage unit 150. The attribute storage unit 150 stores identifying information on each processing operation (operation ID) and the attribute value of each of the attributes of each processing operation, while the operation IDs and the attribute values are related to the corresponding one of the plurality of processing operations. Attributes of each processing operation include attributes of the resultant steel sheet that has passed through the rolling processing (hereinafter simply referred to as "post-rolling"). Examples of such attributes are the type, the width, the thickness, the length and the tension of the post-rolling steel sheet. The thickness of the steel sheet is an example of the second attribute of the present invention, and the post-rolling thickness of a steel sheet rolled in each corresponding processing operation is shown as its attribute value. The width of the steel sheet is an example of the third attribute of the present invention, and shown as its attribute value is the post-rolling width of a steel sheet rolled in each corresponding processing operation.

Moreover, the attributes of the processing operation may include the inspection code used for the inspection of a post-rolling steel sheet, the delivery date of the steel sheet, and the category of quality that the processing operation has to meet. The category of quality is an example of the first attribute of the present invention, and shown as its attribute value for each of the corresponding processing operations is any one of the following: a difficult processing operation (D), a recovery processing operation (R), a superior quality processing operation (S) and any other type of processing operation (O). Here, the difficult processing operation (D) impairs the durability of the work rolls 110. The recovery processing operation (R) recovers the durability of the work rolls 110. The superior quality processing operation (S) has to produce a steel sheet with a superior quality to a predetermined standard quality. Note that it is not necessary to store the category of quality itself in the attribute storage unit 150, and that the category of quality may be determined according to other attributes such as the thickness, the tension and the inspection code of a steel sheet.

FIG. 3 shows an example of a data structure of the problem storage unit 160. The problem storage unit 160 stores a sequence constraint defined between each one of the processing operations and another one of the processing operations according to each of the attributes. For instance, the problem storage unit 160 stores a constraint on width transition as a third sequence constraint based on the third attribute. The constraint on width transition is a constraint that the width of a steel plate rolled in the processing operation arranged later in the sequence should be narrower than the width of a steel plate rolled in the processing operation arranged earlier in the sequence. With this constraint, it is possible to prevent the groove left on the work rolls 110 from leaving a flaw on the surface of a steel sheet. Note that, although FIG. 3 shows the name indicating the constraint for convenience of explanation, the problem storage unit 160 may store a function or the like for judging whether or not the sequence of the processing operations satisfies this constraint.

The problem storage unit 160 stores a constraint on thickness transition as a second sequence constraint based on the second attribute. This constraint on thickness transition is a constraint that the value of a difference in thickness between two steel plates to be rolled in two successive processing operations should be within a predetermined range. With this constraint, it is possible to reduce the time required for the thickness adjustment, and thereby allowing a plurality of successive processing operations to be performed speedily. In addition, the problem storage unit 160 stores a constraint between difficult manufacture slabs, a constraint on a recovery slab, and a constraint on a superior quality slab. The constraint between difficult manufacture slabs is a constraint that prohibits successively performing greater than or equal to a predetermined number, or greater than the predetermined number, of difficult processing operations. In addition, the constraint on a recovery slab is a constraint that a recovery processing operation should be performed between two difficult processing operations. The constraint on a superior quality slab is a constraint that a processing operation for a superior quality steel sheet should be performed at a predetermined block. As for the block, descriptions will be given hereinafter with reference to FIG. 4.

The problem storage unit 160 stores an objective function. This objective function is a function for calculating an index value indicating the efficiency of steel plate processing. For example, this objective function may evaluate the processing efficiency according to the length of steel sheets rolled through one set of work rolls 110: a longer length means a higher efficiency. Alternatively, this objective function may evaluate the processing efficiency according to the frequency of recovery processing operations performed by one set of work rolls 110: a lower frequency means a higher efficiency. Still alternatively, this objective function may evaluate the processing efficiency according to the frequency of actual delivery delays from the delivery date fixed for each steel sheet: a lower frequency means a higher efficiency.

Figure 4:
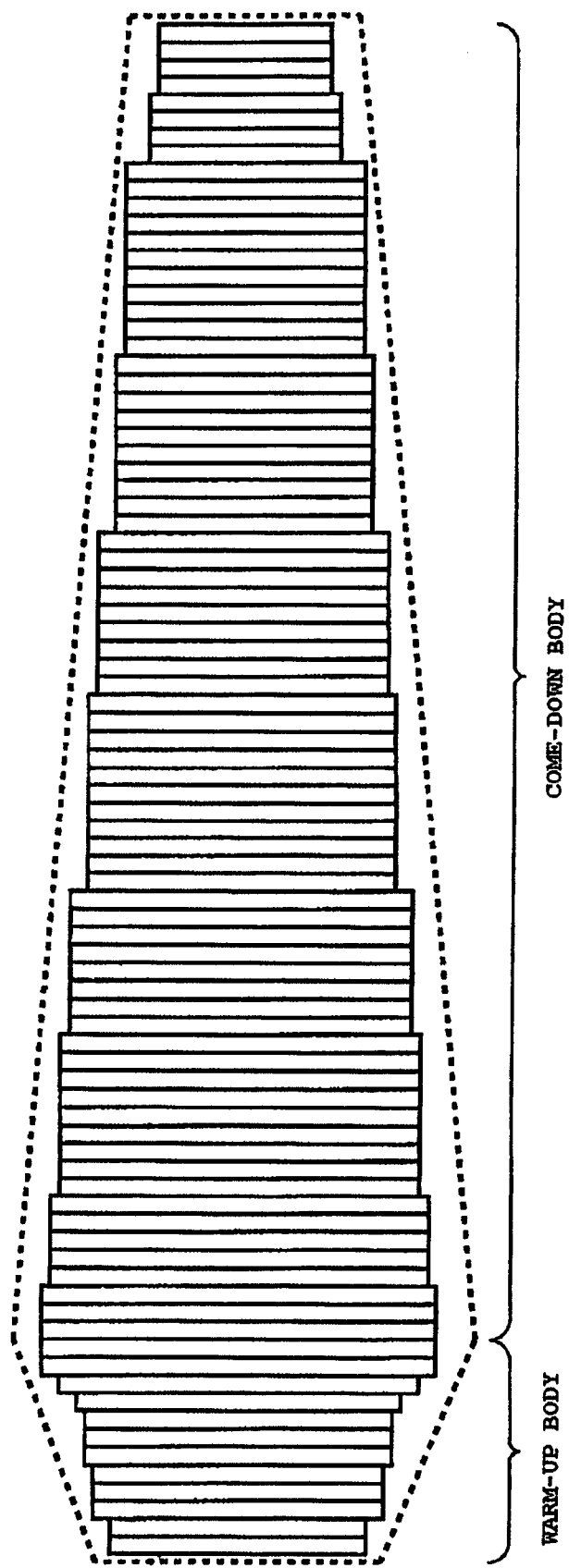
FIG. 4 shows an example of a sequence of processing operations.

FIG. 4 shows an example of the sequence of processing operations. Each of rectangular regions shown in FIG. 4 schematically represents a post-rolling steel sheet. The length of each rectangular region in up-and-down directions in FIG. 4 denotes the width of each post-rolling steel sheet. The left-to-right direction in FIG. 4 denotes the lapse of time. For example, during a period (called a warm-up period) just after an exchange of work rolls, a plurality of steel plates are rolled in a sequence so as to gradually increase the widths of the respective post-rolling steel sheets (a warm-up body in FIG. 4). In this way, it is possible to increase a temperature of work rolls gradually, and to make the work rolls ready for rolling a steel plate for a superior quality steel sheet. Moreover, during a period (called a come-down period) following a time when a certain number of rolling processing operations are completed after the exchange of the work rolls, a plurality of steel plates are rolled in a sequence so as to gradually decrease the widths of the respective post-rolling steel sheets (a come-down body in FIG. 4). In this way, it is possible to avoid a flaw left on the surfaces of the steel sheet rolled later.

A series of the steel plates with various widths are rolled in a period from a time of starting to roll with work rolls to a time of exchanging the work rolls with new ones. It is desirable that a coffin shape, as is described above, be formed by the varying widths of steel plates arranged in time series. The sequence determination system 140 of the present invention aims at maximizing the efficiency of steel plate processing, while satisfying the various constraints including the transition in the widths of the steel sheets as shown in FIG. 4. This will be described in detail below.

Figure 5:
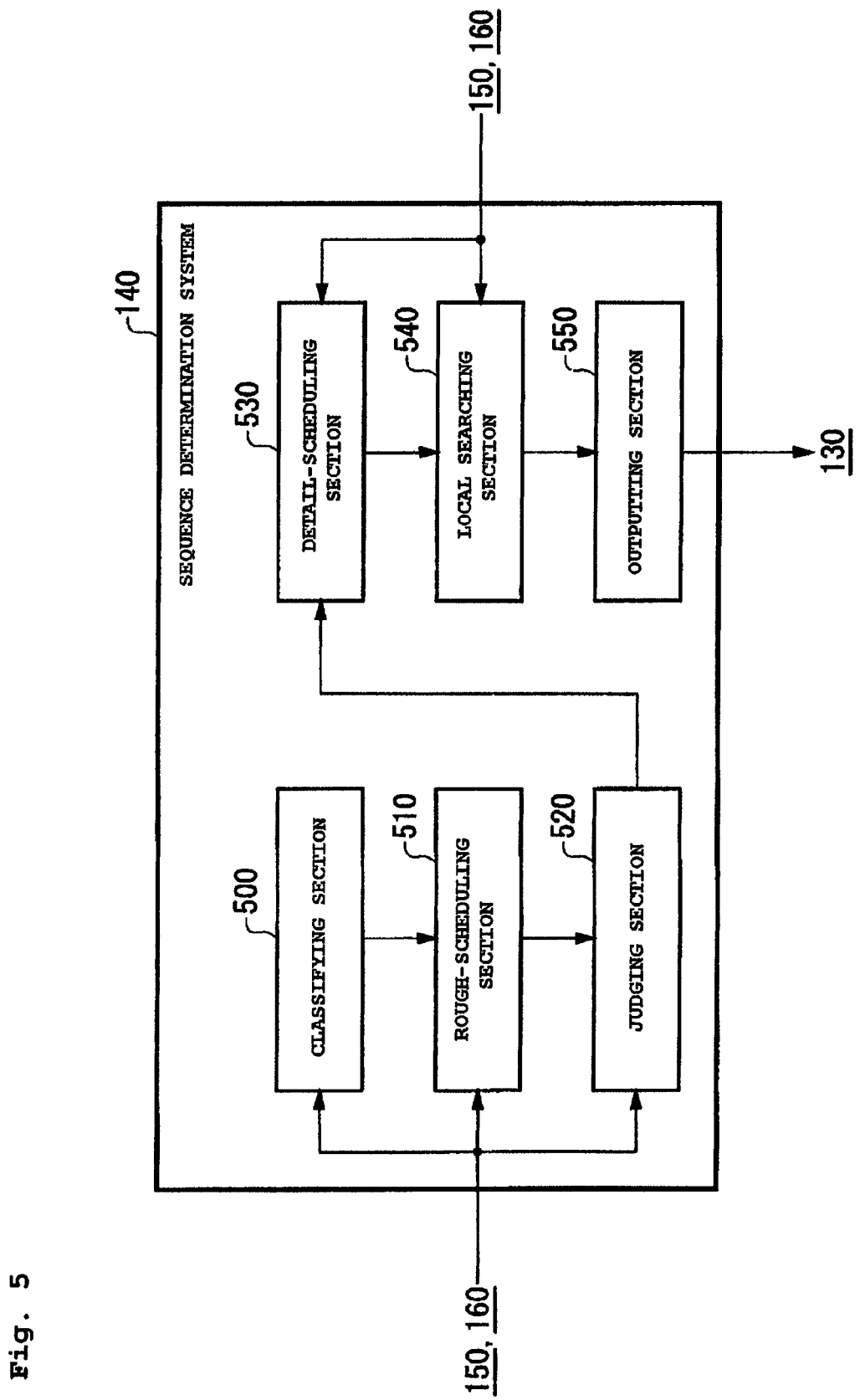
FIG. 5 shows a functional structure of a sequence determination system 140.

FIG. 5 shows a functional structure of the sequence determination system 140. The sequence determination system 140 includes a classifying section 500, a rough-scheduling section 510, a judging section 520, a detail-scheduling section 530, a local searching section 540 and an outputting section 550. For the purpose of classifying a plurality of processing operations into a plurality of clusters, the classifying section 500 sequentially selects at least one of the processing operations as a cluster. At this time, the processing operations are classified into the clusters according to the attribute values of the first attribute. For example, all the processing operations in each cluster have a common attribute value of the first attribute. Moreover, in each cluster, the processing operations in the cluster are arranged in a sequence satisfying the second sequence constraint and the third sequence constraint. For example, all the categories of quality of the processing operations in each cluster are the same, and the processing operations in the cluster are arranged in a sequence satisfying the constraint on width transition and the constraint on thickness transition.

The rough-scheduling section 510 regards each of the first sequence constraint and the third sequence constraint as a constraint between the plurality of clusters, and arranges the plurality of processing operations in a sequence maximizing the efficiency of steel plate processing. The sequencing of the processing operations may be carried out by solving an integer programming problem. For example, by making the determining of which cluster of the processing operations to be performed in each of a plurality of blocks to be an integer programming problem, the rough-scheduling section 510 may solve this integer programming problem. Here, the plurality of blocks consists of divided pieces of a period from a time of starting to roll steel plates through a set of work rolls 110 to a time of exchanging the work rolls 110 with new ones after sequentially rolling a plurality of steel plates. The above-mentioned period is called a round. In addition, FIG. 8 shows an example of dividing a round to make a plurality of blocks.

Figure 8:
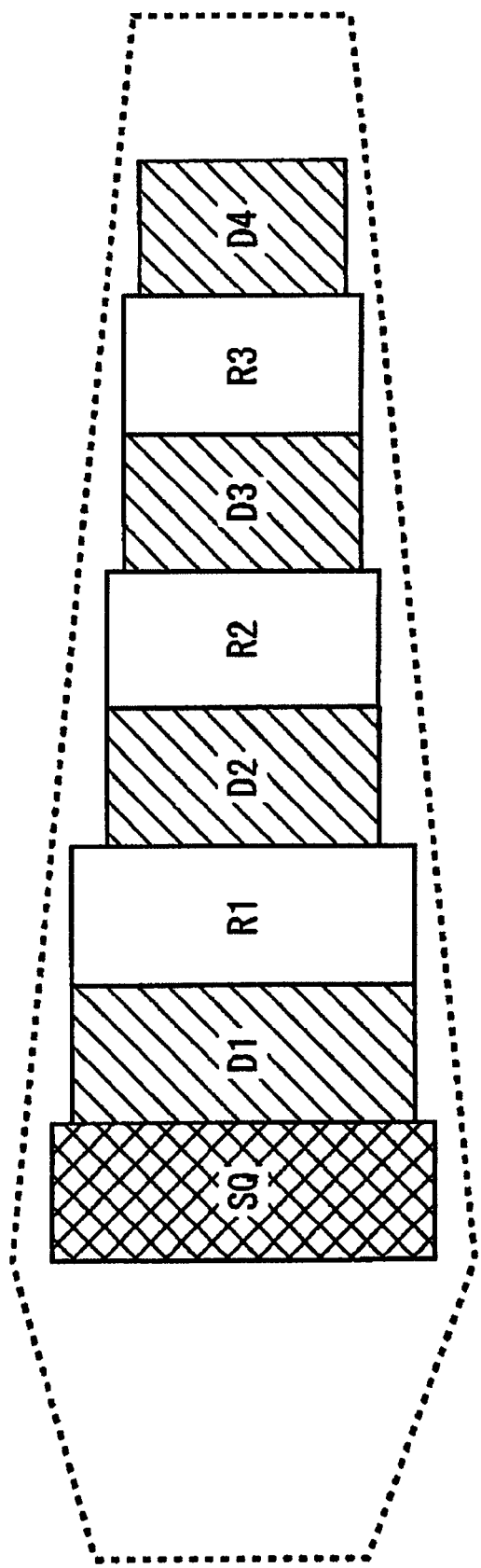
FIG. 8 shows specific examples of a plurality of blocks constituting one round.

FIG. 8 shows the specific examples of the plurality of blocks constituting one round. The come-down period of this round is divided into a plurality of blocks each of which is represented as a rectangular in FIG. 8. Each block is represented by an identifier corresponding to the kind of processing operation included in the block. For example, the plurality of blocks consists of a block SQ, a block D1, a block R1, a block D2, a block R2, a block D3, a block R3 and a block D4. In the block SQ, the surface condition of the work rolls 110 is good enough to roll a high quality steel sheet therethrough. When the difficult processing operations are performed in the blocks D1 to D4, it is inevitable that the recovery processing operations be performed in the blocks R1 to R3.

Figure 9:
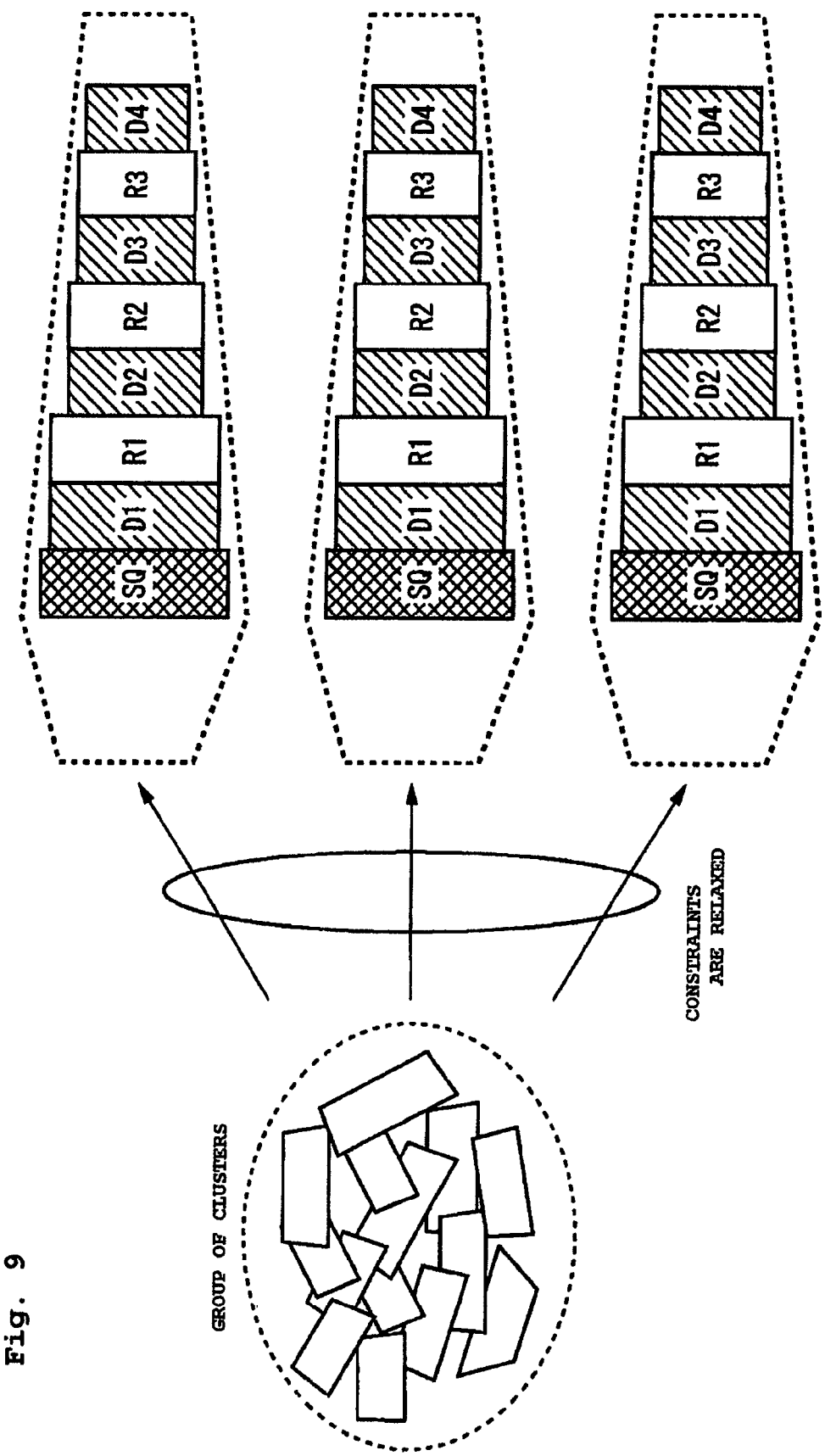
FIG. 9 is a conceptual diagram of a process for assigning a plurality of clusters to a plurality of blocks.

FIG. 9 is a conceptual diagram of a process for assigning a plurality of clusters to a plurality of blocks. The left-hand side of FIG. 9 shows the plurality of clusters classified by the classifying section 500. The rough-scheduling section 510 selects some clusters capable of maximizing the efficiency of processing among all the clusters, and determines which cluster of the processing operations to be performed in which block by using which set of work rolls among a plurality of sets of work rolls. It is not necessary to assign each of the classified clusters to any one of the blocks. These clusters that have not been assigned are to be assigned in the next occasion together with the other clusters to be classified in the next occasion by the classifying section 500. As just described, it is not necessary to assign all the clusters, and this makes it possible to increase the degree of freedom in the sequence determination. Moreover, a cluster is to be assigned to a round among a plurality of rounds, instead of being assigned to only a fixed round. This makes it possible to improve the degree of freedom, and to increase the efficiency of processing.

Here, the description goes back to FIG. 5. The judging section 520 judges whether or not the second sequence constraint is satisfied between the last processing operation in the array of the first cluster, and the first processing operation in the array of the second cluster arranged next to the first cluster. On condition that the second sequence constraint is not satisfied, the detail-scheduling section 530 searches for another processing operation satisfying the second sequence constraint with the last processing operation in the array of the first cluster, and with the first processing operation in the array of the second cluster. The detail-scheduling section 530 then arranges the searched-out processing operation (called "the first searched-out processing operation" when necessary) next to the first cluster and before the second cluster.

On condition that the second sequence constraint is satisfied, the local searching section 540 attempts to modify the sequence of the processing operations in order to further improve the efficiency of processing. For instance, the local searching section 540 judges a change in the value of the objective function, in a case where each of a plurality of means for modifying the sequence of the plurality of processing operations is applied to each of the processing operations arranged by the rough-scheduling section 510 and the detail-scheduling section 530. The plurality of means used for modifying the sequence include operations such as inserting and deleting a processing operation, and exchanging processing operations with one another. In other words, for example, the local searching section 540 judges whether the sequence constraints are satisfied and whether the value of the objective function increases, even if one of the already-arranged processing operations is deleted. In a case where the sequence constraints are satisfied, and where the value of the objective function increases, the local searching section 540 deletes the processing operation. The local searching section 540 repeatedly executes the above-mentioned operation for each of the processing operations and for each of the means. However, since a time required for this operation exponentially increases, it is desirable that the operation be finished when the computation time reaches a predetermined upper limit.

The outputting section 550 outputs the array sequence of the plurality of processing operations arranged in each of the clusters, and the processing operations arranged by the detail-scheduling section 530. This sequence depends on the sequence of the clusters arranged by the rough-scheduling section 510, the sequence of the processing operations arranged by the detail-scheduling section 530, and the sequence modified by the local searching section 540.

Figure 6:
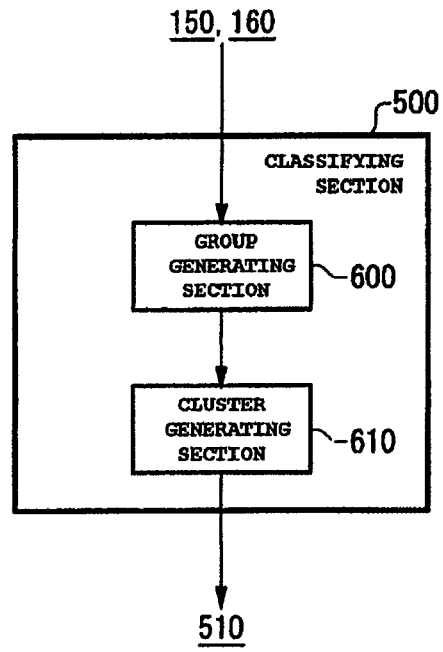
FIG. 6 shows a functional structure of a classifying section 500.

FIG. 6 shows a functional structure of the classifying section 500. The classifying section 500 includes a group generating section 600 and a cluster generating section 610. The group generating section 600 sequentially reads the attribute values of the first attribute from the attribute storage unit 150, and classifies a plurality of processing operations having a common attribute value of the first attribute into a group. In other words, only difficult processing operations are classified into a certain group, and different types of processing operations are not classified into the group. On the other hand, a plurality of difficult processing operations may be classified in a plurality of groups.

From the attribute storage unit 150, the cluster generating section 610 reads the attribute values of the second and the third attributes of each of a plurality of processing operations classified into a certain group. Then, the cluster generating section 610 rearranges the processing operations in a sequence satisfying the second sequence constraint and the third sequence constraint. Specifically, the cluster generating section 610 rearranges a plurality of steel plates in descending order of post-rolling width of steel sheets, and judges whether each of the plurality of thus rearranged processing operations satisfies the third sequence constraint. In a case where the third sequence constraint is not satisfied, for example, in a case where there is a processing operation for a steel plate of a particularly different thickness, this processing operation may be excluded from the sequence. Then, the cluster generating section 610 selects each part of the plurality of processing operations thus rearranged as a cluster. The processing operation which does not satisfy the third sequence constraint and which is excluded may form a cluster by itself, or together with another processing operation for a steel sheet of a similar thickness.

Figure 7:
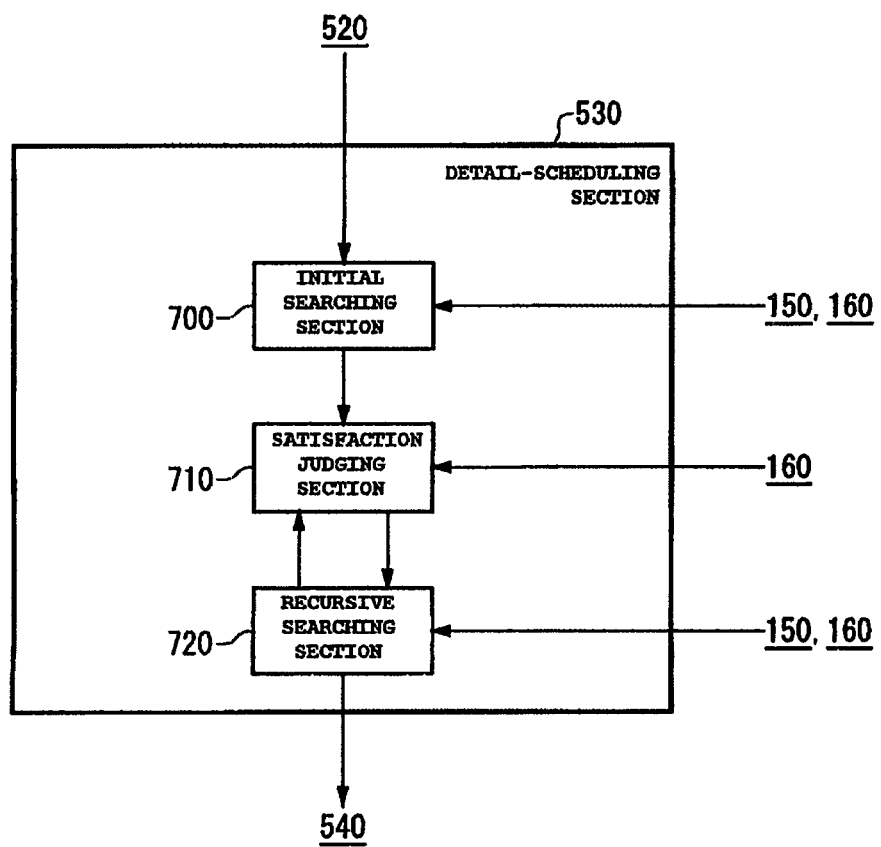
FIG. 7 shows a functional structure of a detail-scheduling section 530.

FIG. 7 shows a functional structure of the detail-scheduling section 530. The detail-scheduling section 530 includes an initial searching section 700, a satisfaction judging section 710 and a recursive searching section 720. The initial searching section 700 searches for another processing operation satisfying the second sequence constraint with any one (called "a first matching processing operation") of the last processing operation in the array of the first cluster, and the first processing operation in the array of the second cluster arranged next to the first cluster. For example, in order to find such a processing operation, the initial searching section 700 may search a plurality of processing operations included in clusters not arranged by the rough-scheduling section 530 among the processing operations specified by a user for respectively processing a plurality of thick plates 200. In addition, it is desirable that the processing operations to be searched satisfy all the other constraints with the first matching processing operation.

Figure 10:
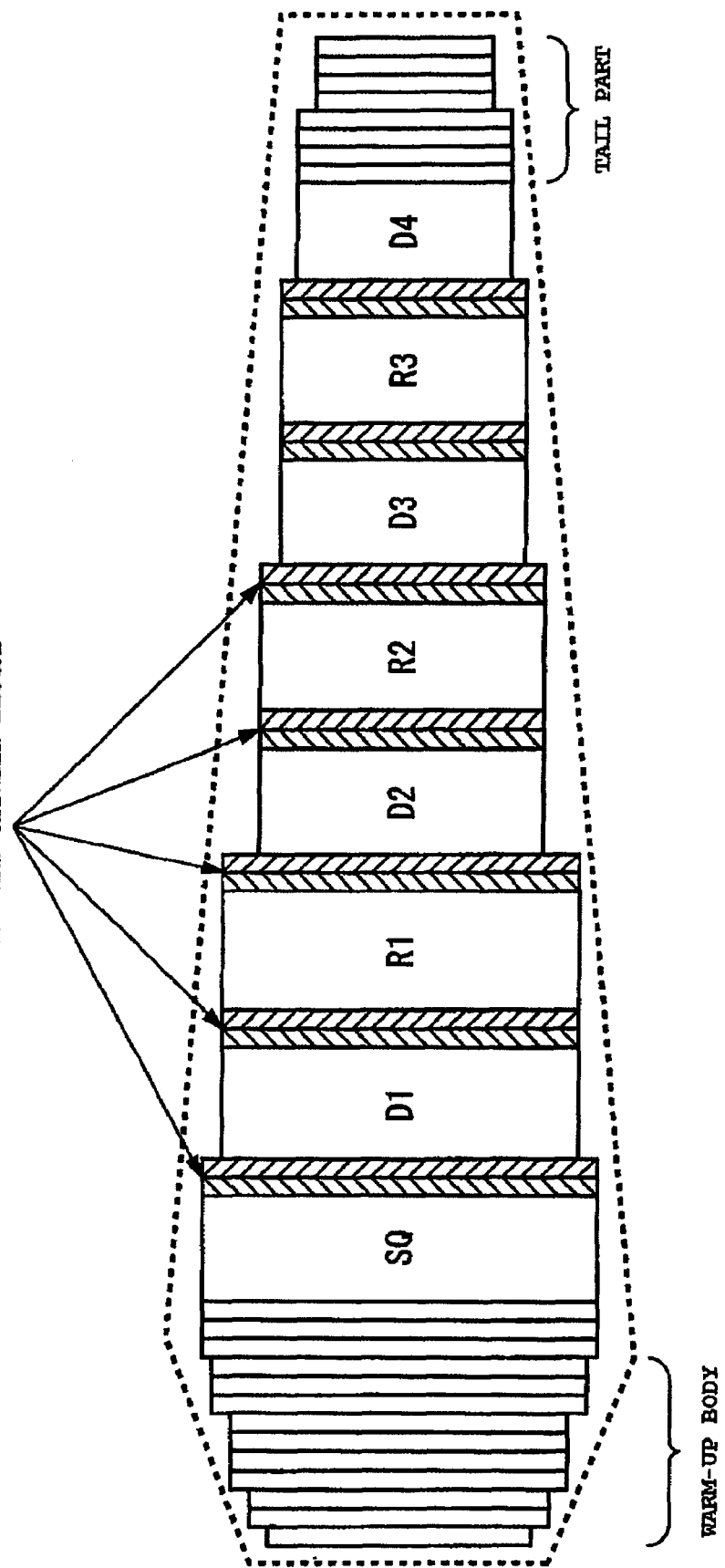
FIG. 10 is a conceptual diagram of a process for generating a detailed schedule satisfying constraints between clusters.

FIG. 10 is a conceptual diagram of a process for generating a detailed schedule satisfying the constraints between the clusters. There is a case where two processing operations arranged at the boundary between two blocks (shaded areas in FIG. 10) do not satisfy the second sequence constraint. In such a case, the initial searching section 700 scans each of the boundaries between the blocks, and sequentially searches for a processing operation to be inserted in boundaries, when necessary, so that the first cluster and the second cluster arranged at each boundary can satisfy the second sequence constraint. For each boundary, the satisfaction judging section 710 and the recursive searching section 720 execute the following processes.

The description goes back to FIG. 7. The satisfaction judging section 710 judges whether the second sequence constraint is satisfied between the first searched-out processing operation and the other one (called "a second matching processing operation") of the last processing operation in the array of the first cluster, and the first processing operation in the array of the second cluster. On condition that the second sequence constraint is not satisfied, the recursive searching section 720 further searches for another processing operation (to be a "second searched-out processing operation") satisfying the second sequence constraint with the first searched-out processing operation, and gives the second searched-out processing operation to the satisfaction judging section 710. Upon receipt of the second searched-out processing operation, the satisfaction judging section 710 judges whether the second sequence constraint is satisfied between the second searched-out processing operation and the second matching processing operation. On condition that the second sequence constraint is not satisfied, the recursive searching section 720 further searches for a processing operation satisfying the second sequence constraint with the second searched-out processing operations.

Once the satisfaction judging section 710 judges that the second sequence constraint is satisfied, the detail-scheduling section 530 arranges at least one of the processing operations that are sequentially searched out by the initial searching section 700 and the recursive searching section 720, next to the first cluster and before the second cluster.

Figure 11:
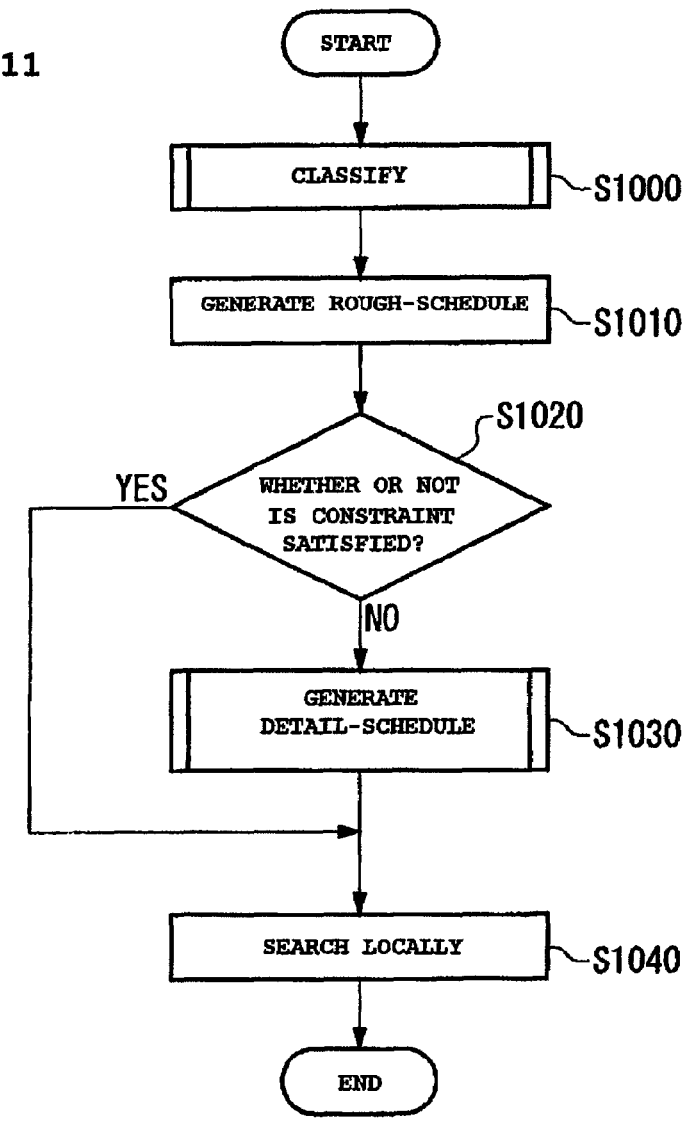
FIG. 11 shows a flowchart of a process for arranging processing operations by classifying them into clusters.

FIG. 11 shows a flowchart of a process for arranging processing operations by classifying them into clusters. The classifying section 500 classifies a plurality of processing operations into a plurality of clusters (S1000). All the plurality of processing operations in a certain cluster have a common attribute value of the first attribute. Here, assume that: C denotes a set of classified clusters; $C^D$ denotes a set of clusters including difficult processing operations; $C^R$ denotes a set of clusters including recovery processing operations; $C^{SQ}$ denotes a set of clusters including superior quality processing operations; and $C^O$ denotes a set of clusters other than the three sets $C^D$, $C^R$ and $C^{SQ}$ among the set C.

The rough-scheduling section 510 regards the first sequence constraint and the third sequence constraint as constraints between a plurality of clusters, and arranges the plurality of processing operations in a sequence maximizing the efficiency of steel plate processing by solving an integer programming problem (S1010). This integer programming problem is a problem for finding to which block in which round each of the plurality of clusters is to be assigned. Here, assume that R denotes a set of rounds to which the clusters are to be assigned, and that S denotes a set of blocks.

A variable of this integer programming problem holds, for each block and for each cluster, a state value indicating whether or not processing operations included in the cluster are performed in the block. Here, $x_{i,j,k}$ denotes this variable. In a case where a cluster $k \in C$ is assigned to a block $j \in S$ in a round $i \in R$, this variable is 1, and otherwise, this variable is zero.

This integer programming problem includes the first sequence constraint regarded as the constraint between clusters. For example, the first sequence constraint expresses, as linear inequalities of variables, the range of numbers of clusters which include the processing operations of the attribute values of the first attributes, and which are assigned to each block for each of the attributes. Formula 1 shows the constraint between difficult manufacture slabs, which is one of the first sequence constraints. This constraint indicates whether a cluster consisting of difficult processing operations is assigned to each of the difficult manufacturing blocks (D1 to D3), or a cluster other than that is assigned thereto.

[Formula 1]

$$\sum_{k \in C^D \cup C^O} x_{i,D1,k} = \sum_{k \in C^D \cup C^O} x_{i,D2,k} = $$
$$\sum_{k \in C^D \cup C^O} x_{i,D3,k} = \sum_{k \in C^D \cup C^O} x_{i,D4,k} = 1 \text{ for each } i \in R$$
$$\sum_{k \in C/(C^D \cup C^O)} x_{i,D1,k} = $$
$$\sum_{k \in C/(C^D \cup C^O)} x_{i,D2,k} = \sum_{k \in C/(C^D \cup C^O)} x_{i,D3,k} = $$
$$\sum_{k \in C/(C^D \cup C^O)} x_{i,D4,k} = 0 \text{ for each } i \in R$$

Formula 1

Additionally, the constraint between difficult manufacture slabs may also be expresses as inequalities shown in Formula 2. This constraint prohibits assigning a cluster consisting of difficult processing operations of a first group (Gx) to a block before a block to which a cluster consisting of difficult processing operations of a second group (Gy) is assigned. Certain characteristics of processing operations allow the addition of such a constraint.

[Formula 2]

$$\sum_{k \in G_x} x_{i,D1,k} + \sum_{k \in G_y} x_{i,D2,k} \le 1 \text{ for each } i \in R$$
$$\sum_{k \in G_x} x_{i,D2,k} + \sum_{k \in G_y} x_{i,D3,k} \le 1 \text{ for each } i \in R$$
$$\sum_{k \in G_x} x_{i,D3,k} + \sum_{k \in G_y} x_{i,D4,k} \le 1 \text{ for each } i \in R$$

Formula 2

Moreover, the constraint between difficult manufacture slabs may be expressed as inequalities shown in Formula 3. This constraint prohibits assigning a cluster consisting of difficult processing operations of a first group (Gx) to the same round of a cluster consisting of difficult processing operations of a second group (Gy). Certain characteristics of processing operations also allow the addition of such a constraint.

[Formula 3]

$$\sum_{j \in S, k \in G_x} x_{i,j,k} \le L \cdot z_1$$
$$\sum_{j \in S, k \in G_y} x_{i,j,k} \le L \cdot z_2$$
$$z_1 + z_2 \le 1 \text{ for each } i \in R$$

Formula 3

Note that, in Formula 3, L is a sufficiently large positive constant, and that each of z1 and z2 is a two-valued variable taking a value of 1 or 0.

Furthermore, Formula 4 shows the constraint on a superior quality slab, which is one of the first sequence constraints. This constraint indicates that the superior quality processing operation requiring a steel sheet with superior quality to predetermined standard quality should be performed in a block SQ.

[Formula 4]

$$\sum_{k \in C^{SQ} \cup C^O} x_{i,SQ,k} = 1 \text{ for each } i \in R$$
$$\sum_{k \in C/(C^{SQ} \cup C^O)} x_{i,SQ,k} = 0 \text{ for each } i \in R$$

Formula 4

Formulas 5 and 6 shows the constraint on a recovery slab, which is one of the first sequence constraints. This constraint indicates that a recovery processing operation should be performed between two clusters each consisting of difficult processing operations.

[Formula 5]

-continued $$\sum_{k \in C^R \cup C^O} x_{i,R1,k} = \quad \text{Formula 5}$$

$$\sum_{k \in C^R \cup C^O} x_{i,R2,k} = \sum_{k \in C^R \cup C^O} x_{i,R3,k} = 1 \text{ for each } i \in R$$

$$\sum_{k \in C/(C^R \cup C^O)} x_{i,R1,k} =$$

$$\sum_{k \in C/(C^R \cup C^O)} x_{i,R2,k} = \sum_{k \in C/(C^R \cup C^O)} x_{i,R3,k} = 0 \text{ for each } i \in R$$

[Formula 6]

$$\sum_{k \in G_X} x_{i,D1,k} + \sum_{k \in G_y} x_{i,D2,k} \leq \sum_{k \in C^R} x_{i,R1,k} + 1 \text{ for each } i \in R \quad \text{Formula 6}$$

$$\sum_{k \in G_X} x_{i,D2,k} + \sum_{k \in G_y} x_{i,D3,k} \leq \sum_{k \in C^R} x_{i,R2,k} + 1 \text{ for each } i \in R$$

$$\sum_{k \in G_X} x_{i,D3,k} + \sum_{k \in G_y} x_{i,D4,k} \leq \sum_{k \in C^R} x_{i,R3,k} + 1 \text{ for each } i \in R$$

In addition, this integer programming problem has a constraint indicating that no more than one cluster is assigned to each block. This constraint is expressed, for example, as Formula 7.

[Formula 7]

$$\sum_{i \in R_j, i \in S} x_{i,j,k} \leq 1 \text{ for each } k \in C \quad \text{Formula 7}$$

This integer programming problem also includes the third sequence constraint regarded as a constraint between clusters. For example, the rough-scheduling section 510 regards the third sequence constraint as a constraint indicating that a post-rolling steel sheet from the last processing operation in the array of a cluster arranged earlier is wider than a post-rolling steel sheet from the first processing operation in the array of a cluster arranged later. Following this constraint, the rough-scheduling section 510 arranges a plurality of clusters. The third sequence constraint regarded as the constraint between clusters is expressed as Formula 8 shown below.

[Formula 8]

$$\sum_{k \in C} WidthL(k) \cdot x_{i,D1,k} - \sum_{k \in C} WidthF(k) \cdot x_{i,R1,k} \geq 0 \quad \text{Formula 8}$$

for each $i \in R$

Note that WidthF(k) denotes a width of a post-rolling steel sheet that is rolled in a first processing operation arranged in the array of a cluster k, and that WidthL(k) denotes a width of a post-rolling steel sheet that is rolled in the last processing operation in the array of the cluster k.

The plurality of clusters are arranged by solving the above-described integer programming problem. Thereafter, the judging section 520 judges whether or not the second sequence constraint is satisfied between the last processing operation in the array of the first cluster, and the first processing operation in the array of the second cluster arranged next to the first cluster. (S1020). On condition that the second sequence constraint is not satisfied (S1020: NO), the detail-scheduling section 530 searches for at least one of the other processing operations each satisfying the second sequence constraint with each of the last processing operation in the array of the first cluster, and the first processing operation in the array of the second cluster (S1030). Then, the detail-scheduling section 530 arranges the searched-out processing operation next to the first cluster and before the second cluster. The detail-scheduling section 530, furthermore, may search the clusters not arranged by the rough-scheduling section 510 for processing operations to be arranged in the warm-up body and a tail part shown in FIG. 10.

On condition that the second sequence constraint is satisfied by the rough-scheduling section 510 and/or the detail-scheduling section 530, the local searching section 540 attempts to modify the sequence of the processing operations in order to further improve the efficiency of processing (S1040). For example, with respect to each of the plurality of processing operations arranged by the rough-scheduling section 510 and the detail-scheduling section 530, the local searching section 540 judges the change of the value of the objective function in a case of deleting the processing operation, and in a case of exchanging the processing operation with another processing operation. In a case where the value of the objective function increases while the sequence constraints are still satisfied, the local searching section 540 improves the efficiency of processing by deleting the processing operation, or by exchanging it with another one.

Figure 12:
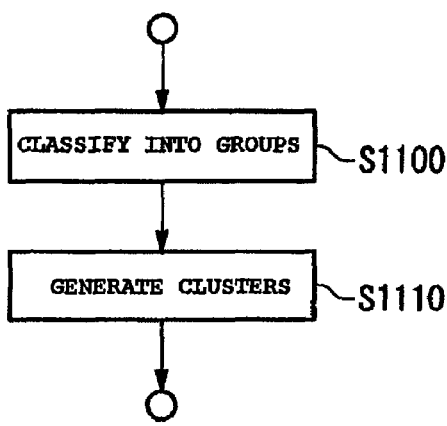
FIG. 12 shows a detail of the process in step S1000.

FIG. 12 shows a detail of the process in step S1000. The group generating section 600 sequentially reads the attribute values of the first attribute from the attribute storage unit 150, and classifies a plurality of processing operations having a common attribute value of the first attribute into a group (S1100). In other words, only difficult processing operations are classified into a certain group, and the other types of processing operations are not classified into the group. Meanwhile, a plurality of difficult processing operations may be classified into a plurality of groups.

Subsequently, the cluster generating section 610 classifies the processing operations included in each group into a plurality of clusters (S1110). In each of the clusters, the sequence satisfies the second sequence constraint and the third sequence constraint. To be more precise, from the attribute storage unit 150, the cluster generating section 610, firstly, reads the attribute values of the respective second and third attributes of each of a plurality of processing operations classified into a certain group. Then, the cluster generating section 610 rearranges the processing operations in a sequence satisfying the second sequence constraint and the third sequence constraint. In other words, for example, the cluster generating section 610 rearranges a plurality of steel plates in descending order of width of post-rolling steel sheets, and judges whether each of the plurality of processing operations thus rearranged satisfies the third sequence constraint. In a case where the third sequence constraint is not satisfied, for example, in a case where there is a processing operation for a steel plate of a particularly different thickness, this processing operation may be excluded from the rearranged sequence. Then, the cluster generating section 610 selects each part of the plurality of thus rearranged processing operations as a cluster. The processing operation that does not satisfy the third sequence constraint and thereby is excluded may form another cluster, by itself or together with another processing operation, to produce a steel sheet with a similar thickness.

Figure 13:
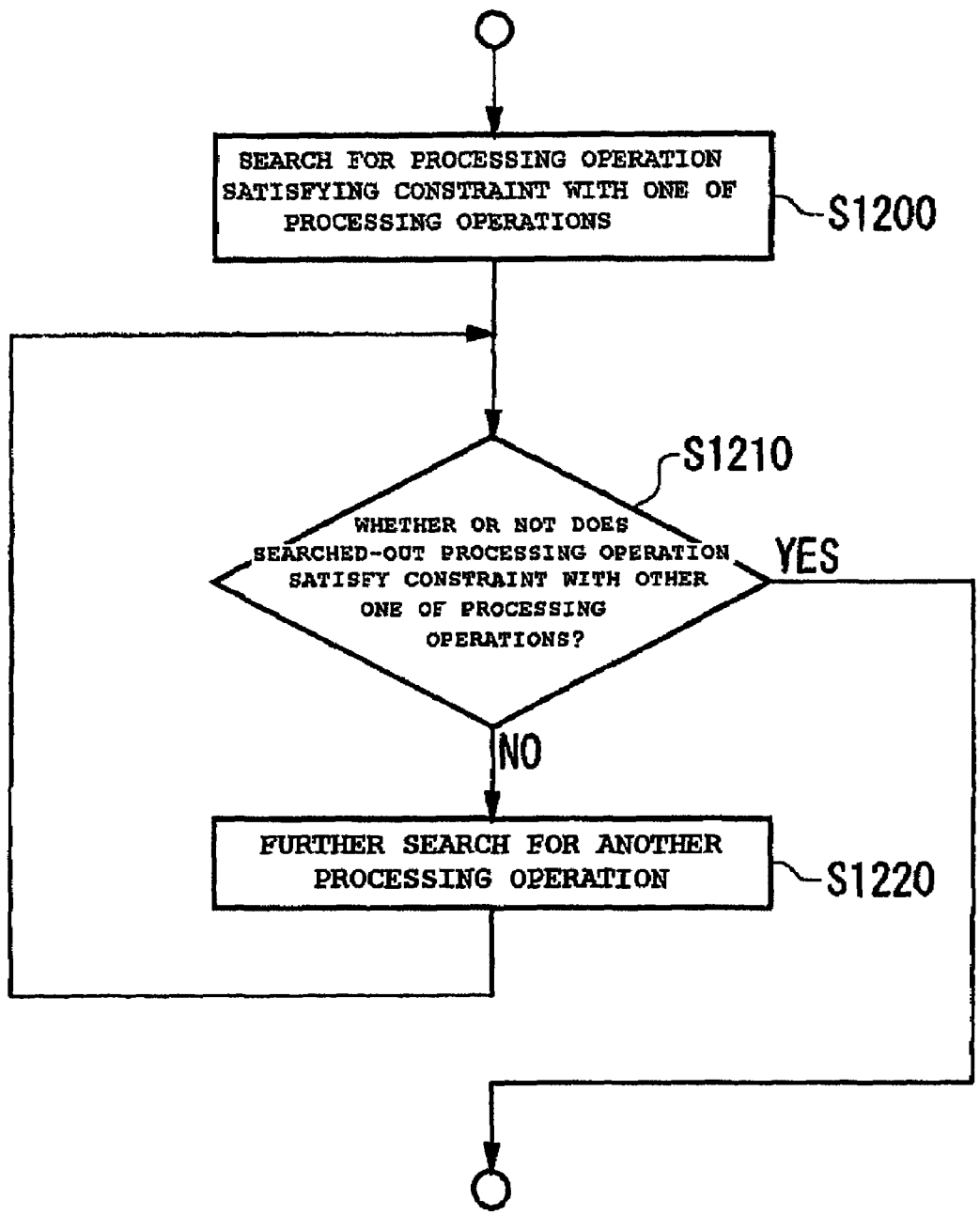
FIG. 13 shows a detail of the process in step S1030.

FIG. 13 shows a detail of the process in step S1030. The initial searching section 700 searches for another processing operation satisfying the second sequence constraint with any one (first matching processing operation) of the last processing operation in the array of the first cluster, and the first processing operation in the array of the second cluster arranged next to the first cluster (S1200). In order to find such a processing operation, for example, the initial searching section 700 may search the processing operations included in clusters not arranged by the rough-scheduling section 530 among a plurality of processing operations each of which is specified by a user for processing a thick plate 200.

The satisfaction judging section 710 judges whether the thus searched-out processing operation satisfies the second sequence constraint with the other one (second matching processing operation) of the last processing operation in the array of the first cluster, and the first processing operation in the array of the second cluster (S1210). On condition that the second sequence constraint is not satisfied (S1210: NO), the recursive searching section 720 further searches for another processing operation satisfying the second sequence constraint with this searched-out processing operation (S1220), and causes the process to go back to step S1210.

Once the satisfaction judging section 710 judges that the second sequence constraint is satisfied, the detail-scheduling section 530 finishes the process shown in FIG. 13. Then, the detail-scheduling section 530 arranges, next to the first cluster and before the second cluster, at least one of the processing operations that are sequentially searched out by the initial searching section 700 and the recursive searching section 720.

Figure 14:
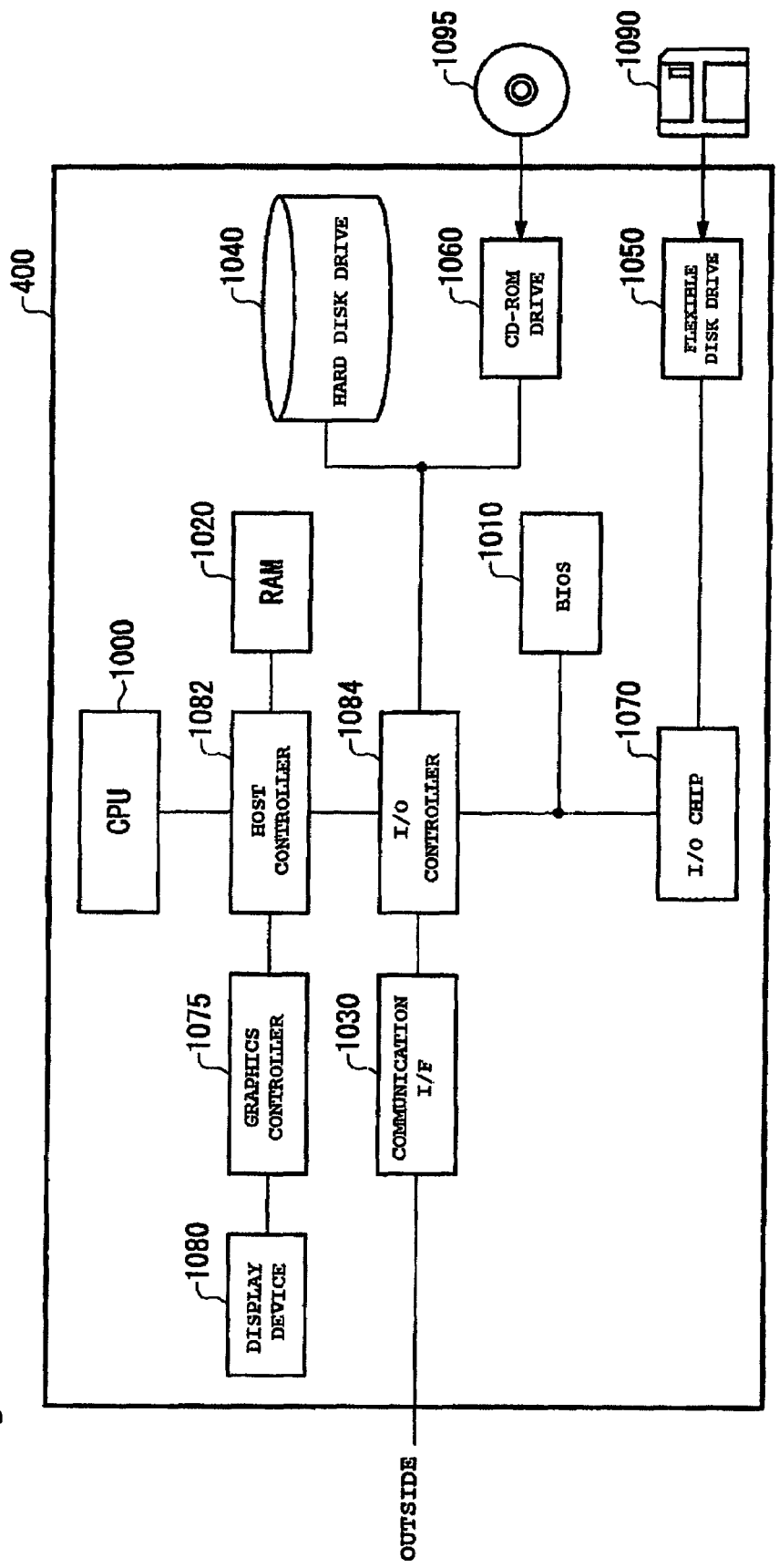
FIG. 14 shows an example of a hardware configuration of an information processing apparatus 400 functioning as the sequence determination system 140.

FIG. 14 shows an example of a hardware configuration of an information processing apparatus 400 functioning as the sequence determination system 140. The information processing apparatus 400 includes a CPU peripheral unit, an input/output unit and a legacy input/output unit. The CPU peripheral unit includes a CPU 1000, a RAM 1020, and a graphics controller 1075, all of which are connected to one another via a host controller 1082. The input/output unit includes a communication interface 1030, a hard disk drive 1040 and a CD-ROM drive 1060, all of which are connected to the host controller 1082 via an input/output controller 1084. The legacy input/output unit includes a BIOS 1010, a flexible disk drive 1050, and an input/output chip 1070, all of which are connected to the input/output controller 1084.

The host controller 1082 connects the RAM 1020 to the CPU 1000 and the graphics controller 1075, both of which access the RAM 1020 at a high transfer rate. The CPU 1000 is operated according to programs stored in the BIOS 1010 and the RAM 1020, and controls each of the components. The graphics controller 1075 obtains image data generated by the CPU 1000 or the like in a frame buffer provided in the RAM 1020, and displays the obtained image data on a display device 1080. Instead, the graphics controller 1075 may internally include a frame buffer that stores the image data generated by the CPU 1000 or the like.

The input/output controller 1084 connects the host controller 1082 to the communication interface 1030, the hard disk drive 1040 and the CD-ROM drive 1060, all of which are higher-speed input/output devices. The communication interface 1030 communicates with an external device via a network. The hard disk drive 1040 stores programs and data to be used by the information processing apparatus 400. The CD-ROM drive 1060 reads a program or data from a CD-ROM 1095, and provides the read-out program or data to the RAM 1020 or the hard disk 1040.

Moreover, the input/output controller 1084 is connected to the BIOS 1010 and lower-speed input/output devices such as the flexible disk drive 1050 and an input/output chip 1070. The BIOS 1010 stores programs, such as a boot program executed by the CPU 1000 at a start-up time of the information processing apparatus 400, and a program that is dependent on hardware of the information processing apparatus 400. The flexible disk drive 1050 reads a program or data from a flexible disk 1090, and provides the read-out program or data to the RAM 1020 or hard disk drive 1040 via the input/output chip 1070. The input/output chip 1070 is connected to the flexible disk drive 1050 and various kinds of input/output devices with, for example, a parallel port, a serial port, a keyboard port, a mouse port and the like.

A program to be provided to the information processing apparatus 400 is provided by a user with the program stored in a recording medium such as the flexible click 1090, the CD-ROM 1095 and an IC card. The program is read from the recording medium via the input/output chip 1070 and/or the input/output controller 1084, and is installed on the information processing apparatus 400. Then, the program is executed. Since an operation that the program causes the information processing apparatus 400 to execute is identical to the operation of the sequence determination system 140 described by referring to FIGS. 1 to 13, the description thereof is omitted here.

The program described above may be stored in an external storage medium. In addition to the flexible disk 1090 and the CD-ROM 1095, examples of the storage medium to be used are an optical recording medium such as DVD and PD, a magneto-optic recording medium such as MD, a tape medium, and a semiconductor memory such as an IC card. Alternatively, the program may be provided to the information processing apparatus 400 via a network, by using, as a recording medium, a storage device such as a hard click and a RAM, provided in a server system connected to a private communication network or the internet.

Figure 15:
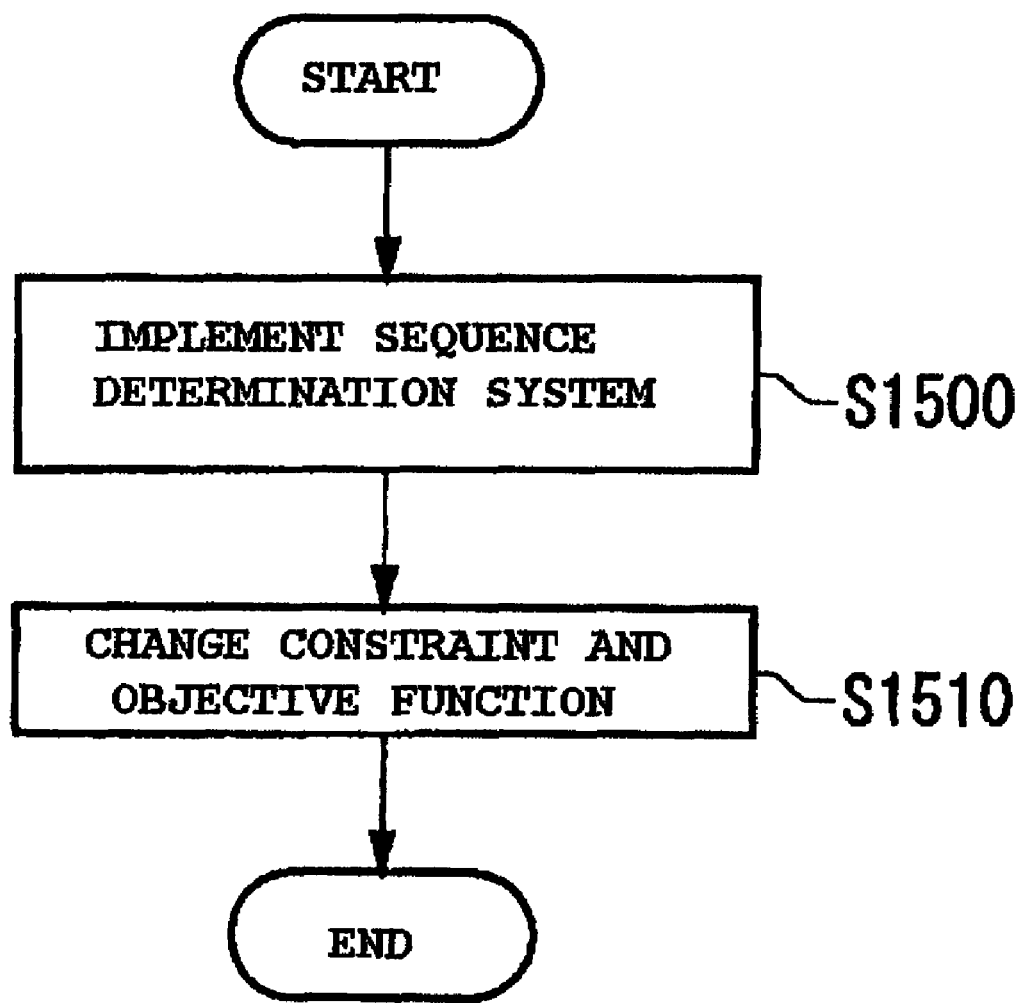
FIG. 15 an example of a providing method for providing a service that uses the sequence determination system 140.

FIG. 15 shows an example of a providing method for providing a service that uses the sequence determination system 140. The sequence determination system 140 makes it possible to provide a service for improving the efficiency of steel plate processing. For example, an engineer implements the sequence determination system 140 in a steel plant (S1500). As described above, the sequence determination system 140 includes the classifying section 500, the rough-scheduling section 510, the judging section 520, the detail-scheduling section 530, the local searching section 540 and the outputting section 550. Then, the engineer changes various sequence constraints or an objective function for determining an array sequence of processing operations in response to a request of a manager of the steel plant. This change can be carried out by changing the content stored in the problem storage unit 160.

By adjusting the sequence constraints or the like in response to the request of the manager of the steel plant in the foregoing way, the sequence determination system 140 can be customized to the needs of various customers, and thereby improving the efficiency of processing.

According to the present invention, the array sequence of processing operations that maximizes the efficiency of processing steel plates can be determined more efficiently than ever before.

Hereinabove, the present invention has been described with reference to a preferred embodiment. However, the technical scope of the present invention is not limited to the above-described embodiment. It is obvious for one skilled in the art that various modifications and improvements may be made to the embodiment. Moreover, it is also obvious from the scope of claims of the present invention that thus modified and improved embodiments are included in the technical scope of the present invention.

Although the preferred embodiment of the present invention has been described in detail, it should be understood that various changes, substitutions and alternations can be made therein without departing from spirit of the inventions as defined by the appended claims.

What is claimed is:

1. A method for determining an array sequence of a plurality of processing operations for processing a plurality of steel plates, wherein
   a first sequence constraint based on a first attribute of each processing operation and a second sequence constraint based on a second attribute of each processing operation are defined between each of the processing operations and each of the other processing operations; and
   the method comprises the steps of:
   classifying the plurality of processing operations into a plurality of clusters according to attribute values of the first attribute, and arranging the processing operations included in each of the clusters in a sequence satisfying the second sequence constraint within the cluster;
   arranging the plurality of clusters in a sequence maximizing the efficiency of processing of steel plates by regarding the first sequence constraint as a constraint between the plurality of clusters;
   judging whether the second sequence constraint is satisfied between a last processing operation in the first cluster and a first processing operation in a second cluster arranged next to the first cluster; and
   searching for another processing operation satisfying the second sequence constraint respectively with the last processing operation of the first cluster and the first processing operation of the second cluster, on condition that the second sequence constraint is not satisfied, and then arranging said another processing operation next to the first cluster and before the second cluster.

2. A method for providing a service for determining an array sequence of a plurality of processing operations each of which processes a plurality of steel plates, wherein
   a first sequence constraint based on a first attribute of each of the plurality of processing operations and a second sequence constraint based on a second attribute of each of the plurality of the processing operations are defined between each of the processing operations and each of the other processing operations; and
   the method comprises the steps of:
   implementing a system including,
   a classifying section classifying the plurality of processing operations into a plurality of clusters based on attribute values of the first attribute, and arranging the processing operations included in each of the clusters in a sequence satisfying the second sequence constraint within a cluster,
   a rough-scheduling section regarding the first sequence constraint as a constraint between the plurality of clusters, and arranging the plurality of clusters in a sequence maximizing the efficiency of steel plate processing,
   a judging section judging whether the second sequence constraint is satisfied between the last processing operation in a first cluster and the first processing operation in a second cluster arranged next to the first cluster, and
   a detail-scheduling section which, on condition that the second sequence constraint is not satisfied, searches for another processing operation satisfying the second sequence constraint with each of a last processing operation in the first cluster and a first processing operation in the second cluster, and which arranges said another processing operation next to the first cluster and before the second cluster; and
   changing at least one of the first sequence constraint, the second sequence constraint, and the objective function.

* * * * *